US012645910B2

(12) United States Patent
Li et al.

(10) Patent No.: US 12,645,910 B2
(45) Date of Patent: Jun. 2, 2026

(54) NEURAL ARCHITECTURE SCALING FOR HARDWARE ACCELERATORS

(71) Applicant: Google LLC, Mountain View, CA (US)

(72) Inventors: Andrew Li, Sunnyvale, CA (US);
Sheng Li, Cupertino, CA (US);
Mingxing Tan, Sunnyvale, CA (US);
Ruoming Pang, New York, NY (US);
Liqun Cheng, Palo Alto, CA (US);
Quoc V. Le, Sunnyvale, CA (US);
Norman Paul Jouppi, Palo Alto, CA
(US)

(73) Assignee: Google LLC, Mountain View, CA (US)

( * ) Notice: Subject to any disclaimer, the term of this
patent is extended or adjusted under 35
U.S.C. 154(b) by 1151 days.

(21) Appl. No.: 17/175,029

(22) Filed: Feb. 12, 2021

(65) Prior Publication Data

US 2022/0230048 A1     Jul. 21, 2022

Related U.S. Application Data

(60) Provisional application No. 63/137,926, filed on Jan.
15, 2021.

(51) Int. Cl.
*G06N 3/04* (2023.01)
*G06N 3/08* (2023.01)
(52) U.S. Cl.
CPC ................ *G06N 3/04* (2013.01); *G06N 3/08*
(2013.01)
(58) Field of Classification Search
CPC ............ G06N 5/02; G06N 5/04; G06N 20/00;
G06N 3/045; G06N 3/006; G06N 3/047;
G06N 3/08; G06N 7/01
See application file for complete search history.

(56) References Cited

U.S. PATENT DOCUMENTS 10,521,729 B2   12/2019   Vasudevan et al.
2019/0057309 A1   2/2019   Oobuchi et al.
(Continued)

FOREIGN PATENT DOCUMENTS

CN         110569969 A     12/2019
CN         111382868 A     7/2020
(Continued)

OTHER PUBLICATIONS

Zheng, Xiawu, et al. "Rethinking performance estimation in neural
architecture search." Proceedings of the IEEE/CVF Conference on
Computer Vision and Pattern Recognition. 2020. https://arxiv.org/
pdf/2005.09917 (Year: 2020).*
(Continued)

*Primary Examiner* — Michael H Hoang
(74) *Attorney, Agent, or Firm* — Lerner David LLP

(57) ABSTRACT

Methods, systems, and apparatus, including computer-read-
able media, for scaling neural network architectures on
hardware accelerators. A method includes receiving training
data and information specifying target computing resources,
and performing using the training data, a neural architecture
search over a search space to identify an architecture for a
base neural network. A plurality of scaling parameter values
for scaling the base neural network can be identified, which
can include repeatedly selecting a plurality of candidate
scaling parameter values, and determining a measure of
performance for the base neural network scaled according to
the plurality of candidate scaling parameter values, in accor-
dance with a plurality of second objectives including a
latency objective. An architecture for a scaled neural net-
work can be determined using the architecture of the base
neural network scaled according to the plurality of scaling
parameter values.

20 Claims, 5 Drawing Sheets

(56) References Cited

U.S. PATENT DOCUMENTS

| | | | | |
|---|---|---|---|---|
| 2019/0354837 A1* | 11/2019 | Zhou | .................. | G06N 3/044 |
| 2020/0143227 A1 | 5/2020 | Tan et al. | | |
| 2020/0234132 A1 | 7/2020 | Tan et al. | | |
| 2021/0350203 A1* | 11/2021 | Das | .................... | G06N 3/08 |

FOREIGN PATENT DOCUMENTS

| | | |
|---|---|---|
| CN | 112088383 A | 12/2020 |
| CN | 112101525 A | 12/2020 |
| EP | 3629246 A1 | 4/2020 |
| TW | 201901534 A | 1/2019 |
| TW | 201937416 A | 9/2019 |
| WO | 2020102421 A1 | 5/2020 |
| WO | 20200154536 A1 | 7/2020 |

OTHER PUBLICATIONS

Xiong, Yunyang, Ronak Mehta, and Vikas Singh. "Resource constrained neural network architecture search: Will a submodularity assumption help?." Proceedings of the IEEE/CVF International Conference on Computer Vision. 2019. (Year: 2019) https://openaccess. thecvf.com/content_ICCV_2019/html/Xiong_Resource_Constrained_ Neural_Network_Architecture_Search_Will_a_Submodularity_ Assumption_ICCV_2019_paper.html.*

Liu, Zhuang, et al. "Rethinking the value of network pruning." arXiv preprint arXiv:1810.05270 (2018). https://arxiv.org/pdf/1810. 05270 (Year: 2018).*

Jaderberg, Max, et al. "Population based training of neural networks." arXiv preprint arXiv:1711.09846 (2017). https://arxiv.org/ pdf/1711.09846 (Year: 2017).*

Fu, Cheng, et al. "Enhancing model parallelism in neural architecture search for multidevice system." IEEE Micro 40.5 (2020): 46-55. https://ieeexplore.ieee.org/stamp/stamp.jsp?tp=&arnumber= 9127125 (Year: 2020).*

Lee et al. S3NAS: Fast NPU-aware Neural Architecture Search Methodology. Sep. 4, 2020. ARXIV.org, Cornell University Library, 201 Olin Library Cornell University, Ithaca, NY 14853, pp. 1-12.

International Search Report and Written Opinion for International Application No. PCT/US2021/043674 dated Jan. 7, 2022. 17 pages.

Goldberg et al., "Rethinking FUN: Frequency-Domain Utilization Networks," retrieved from the internet: Dec. 6, 2020, https://arxiv. org/pdf/2012.03357.pdf>, 9 pages.

Hu et al., "TF-NAS: Rethinking Three Search Freedoms of Latency-Constrained Differentiable Neural Architecture Search," retrieved from the internet Aug. 12, 2020 <https://arxiv.org/pdf/2008.05314. pdf>, 32 pages.

Crankshaw et al., "InferLine: Latency-Aware Provisioning and Scaling for Prediction Serving Pipelines," SoCC '20, Oct. 19-21, 2020, Virtual Event, USA, pp. 477-491.

Crankshaw et al., "Clipper: A Low-Latency Online Prediction Serving System," retrieved from the internet <https://www.usenix. org/system/files/conference/nsdi17/nsdi17-crankshaw.pdf>, 14th USENIX Symposium on Networked Systems Design and Implementation, Mar. 27-29, 2017, Boston, MA, USA, 17 pages.

Chen et al., "AuTO: Scaling Deep Reinforcement Learning for Datacenter-Scale Automatic Traffic Optimization," SIGCOMM '18, Aug. 20-25, 2018, Budapest, Hungary, 15 pages.

Zoph et al. Learning Transferable Architectures for Scalable Image Recognition. CVPR. Apr. 11, 2018. 14 pages.

Zoph et al. Neural Architecture Search with Reinforcement Learning. ICLR. Feb. 15, 2017. 16 pages.

Zhou et al. Resource-Efficient Neural Architect. arXiv preprint arXiv:1806.07912. Jun. 12, 2018. 14 pages.

Zhang et al. ResNeSt: Split-Attention Networks. https://arxiv.org/ abs/2004.08955. Dec. 30, 2020. 12 pages.

Zagoruyko et al. Wide Residual Networks. BMVC. May 23, 2016. 13 pages.

Wu et al. FBNet: Hardware-Aware Efficient ConvNet Design via Differentiable Neural Architecture Search. Proceedings of the IEEE Conference on Computer Vision and Pattern Recognition, pp. 10734-10742. May 24, 2019.

Williams et al. Roofline Performance Modeling for HPC and Deep Learning Applications. GPU Technology Conference (GTC), 2020. 70 pages.

Williams et al. Roofline: An Insightful Visual Performance Model for Multicore Architectures. Communications of the ACM, 52(4):65-76, Apr. 2009.

Wen et al. Learning Structured Sparsity in Deep Neural Networks. Proceedings of Advances in Neural Information Processing Systems (NIPS), Oct. 18, 2016. 10 pages.

Tan et al. EfficientNet: Rethinking Model Scaling for Convolutional Neural Networks. ICML. Sep. 11, 2020. 11 pages.

Abadi et al., "TensorFlow: Large-Scale Machine Learning on Heterogeneous Distributed Systems," (Preliminary White Paper, Nov. 9, 2015), retrieved from the internet http://download.tensorflow.org/ paper/whitepaper2015.pdf, 19 pages.

Arora et al., "Understanding Deep Neural Networks with Rectified Linear Units," Published as a conference paper at ICLR, 2018, 17 pages.

Baker et al., Designing Neural Network Architectures using Reinforcement learning, Published as a conference paper at ICLR 2017, 18 pages.

Tan et al. MnasNet: Platform-Aware Neural Architecture Search for Mobile. CVPR, May 29, 2019. 9 pages.

Szegedy et al. Rethinking the Inception Architecture for Computer Vision. CVPR, 2016. pp. 2818-2826.

Cai et al., "Reinforcement learning for architecture search by network transformation," AAAI, 2018, 10 pages.

Szegedy et al. Inception-v4, Inception-ResNet and the Impact of Residual Connections on Learning. AAAI, 4:12, 2017. 7 pages.

Sandler et al. MobileNetV2: Inverted Residuals and Linear Bottlenecks. CVPR, Apr. 2, 2018. 14 pages.

Russakovsky et al. ImageNet Large Scale Visual Recognition Challenge. International Journal of Computer Vision, 115(3). Jan. 30, 2015. 43 pages.

Cai et al., "Once-for-All: train one network and specialize it for efficient deployment," Published as a conference paper at ICLR 2020, Apr. 29, 2020, 15 pages.

Cai et al., "Proxylessnas: Direct neural architecture search on target task and hardware," Published as a conference paper at ICLR 2019, Feb. 23, 2019, 13 pages.

Ridnik et al. TResNet: High Performance GPU-Dedicated Architecture. Aug. 27, 2020. 12 pages.

Reddi et al. MLPerf Inference Benchmark. May 9, 2020. 15 pages.

Real et al. Regularized Evolution for Image Classifier Architecture Search. AAAI. Feb. 16, 2019. 16 pages.

Ramachandran et al. Searching for Activation Functions. arXiv preprint arXiv:1710.05941. Oct. 27, 2017. 13 pages.

Radosavovic et al. Designing Network Design Spaces. CVPR. Mar. 30, 2020. 12 pages.

Dean, "The Deep Learning Revolution and Its Implications for Computer Architecture and Chip Design ," 2019, retrieved from the internet Jan. 26, 2021, https://arxiv.org/ftp/arxiv/papers/1911/1911. 05289.pdf, 19 pages.

Dong et al., "Ppp-net: Platform-aware progressive search for pareto-optimal neural architectures", Workshop track—ICLR 2018, 4 pages.

Pham et al. Efficient Neural Architecture Search via Parameter Sharing. ICML. Feb. 12, 2018. 11 pages.

Dong et al., "Searching for a robust neural architecture in four gpu hours," In Proceedings of the IEEE Conference on computer vision and pattern recognition, pp. 1761-1770, 2019.

Paszke et al. PyTorch: An Imperative Style, High-Performance Deep Learning Library. Advances in Neural Information Processing Systems 32, pp. 8024-8035. Curran Associates, Inc. Dec. 3, 2019. 12 pages.

Elsken et al., Efficient multi-objective neural architecture search via lamarckian evolution. arXiv preprint arXiv:1804.09081, Published as a conference paper at ICLR 2019, Feb. 26, 2019, 23 pages.

(56) References Cited

OTHER PUBLICATIONS

Park et al. Holistic SparseCNN: Forging the Trident of Accuracy, Speed, and Size. ICLR. Aug. 4, 2016. 11 pages.

Gholami et al., "Squeezenext: Hardware-aware neural network design," ECV Workshop at CVPR'18, Aug. 27, 2018, 12 pages.

Guo et al., "Single path one-shot neural architecture search with uniform sampling," European Conference on Computer Vision, Springer, Jul. 8, 2020, pp. 544-560.

Gupta et al., "Efficientnet-edgetpu: Creating accelerator-optimized neural networks with autoML," Google AI Blog, Aug. 6, 2019, 2 pages.

Han et al., "Learning both Weights and Connections for Efficient Neural Networks," Proceedings of Advances in Neural Information Processing Systems (NIPS), Oct. 30, 2015. 9 pages.

He et al., "Deep residual learning for image recognition," CVPR, Dec. 10, 2015, 12 pages.

Nvidia Corporation. Nvidia A100 Tensor Core GPU Architecture. White Paper, 2020. 82 pages.

Zhang et al. Fast Hardware-aware Neural Architecture Search. Proceedings of the IEEE/CVF Conference on Computer Vision and Pattern Recognition Workshops. Apr. 20, 2020. 10 pages.

Luo et al. Neural Architecture Optimization. arXiv preprint arXiv:1808. 07233. Sep. 4, 2019. 16 pages.

Lu et al. NSGA-Net: Neural Architecture Search using Multi-Objective Genetic Algorithm. Proceedings of the Genetic and Evolutionary Computation Conference. Apr. 18, 2019, 13 pages.

Liu et al. Efficient Sparse-Winograd Convolutional Neural Networks. ICLR, Feb. 18, 2018, 10 pages.

Liu et al. DARTS: Differentiable Architecture Search. arXiv preprint arXiv:1806.09055. Apr. 23, 2019. 13 pages.

He et al., "Amc: Automl for model compression and acceleration on mobile devices,". ECCV, Jan. 16, 2019, 17 pages.

Howard et al., "Searching for mobilenetv3," ICCV, 2019, 11 pages.

Howard et al., Mobilenets: Efficient convolutional neural networks for mobile vision applications. arXiv preprint arXiv:1704.04861, Apr. 17, 2017, 9 pages.

Hsu et al., "MONAS: Multi-objective neural architecture search using reinforcement learning," arXiv preprint arXiv:1806.10332, Dec. 3, 2018, 8 pages.

Hu et al., "Squeeze- and-excitation networks," CVPR, May 16, 2019, 13 pages.

Iandola et al., Squeezenet: Alexnet-level accuracy with 50x fewer parameters and <0.5 mb model size. arXiv preprint arXiv:1602. 07360, Under review as a conference paper at ICLR 2017, Nov. 4, 2016, 13 pages.

Jouppi et al., "In-datacenter performance analysis of a tensor processing unit,". ISCA '17, Jun. 24-28, 2017, 12 pages.

Kandasamy et al., "Neural architecture search with bayesian optimisation and optimal transport," arXiv preprint arXiv:1802.07191, Mar. 15, 2019, 32 pages.

Li et al., "Enabling sparse winograd convolution by native pruning," CoRR, arXiv preprint arXiv:1702.08597, 2017—arxiv.org, 8 pages.

Li et al., "Partial order pruning: for best speed/accuracy trade-off in neural architecture search" In Proceedings of the IEEE Conference on computer vision and pattern recognition, eprint arXiv:1903. 03777, Mar. 2019, pp. 9145-9153.

Liu et al., "Progressive neural architecture search" ECCV, Jul. 26, 2018, 20 pages.

Office Action for Taiwanese Patent Application No. 110124428 dated Nov. 13, 2023. 9 pages.

Office Action for Japanese Patent Application No. 2023-524743 dated May 7, 2024. 4 pages.

Office Action for Taiwanese Patent Application No. 110124428 dated May 7, 2024. 8 pages.

Office Action for Chinese Patent Application No. 202180065581.5 dated Nov. 12, 2025. 9 pages.

* cited by examiner

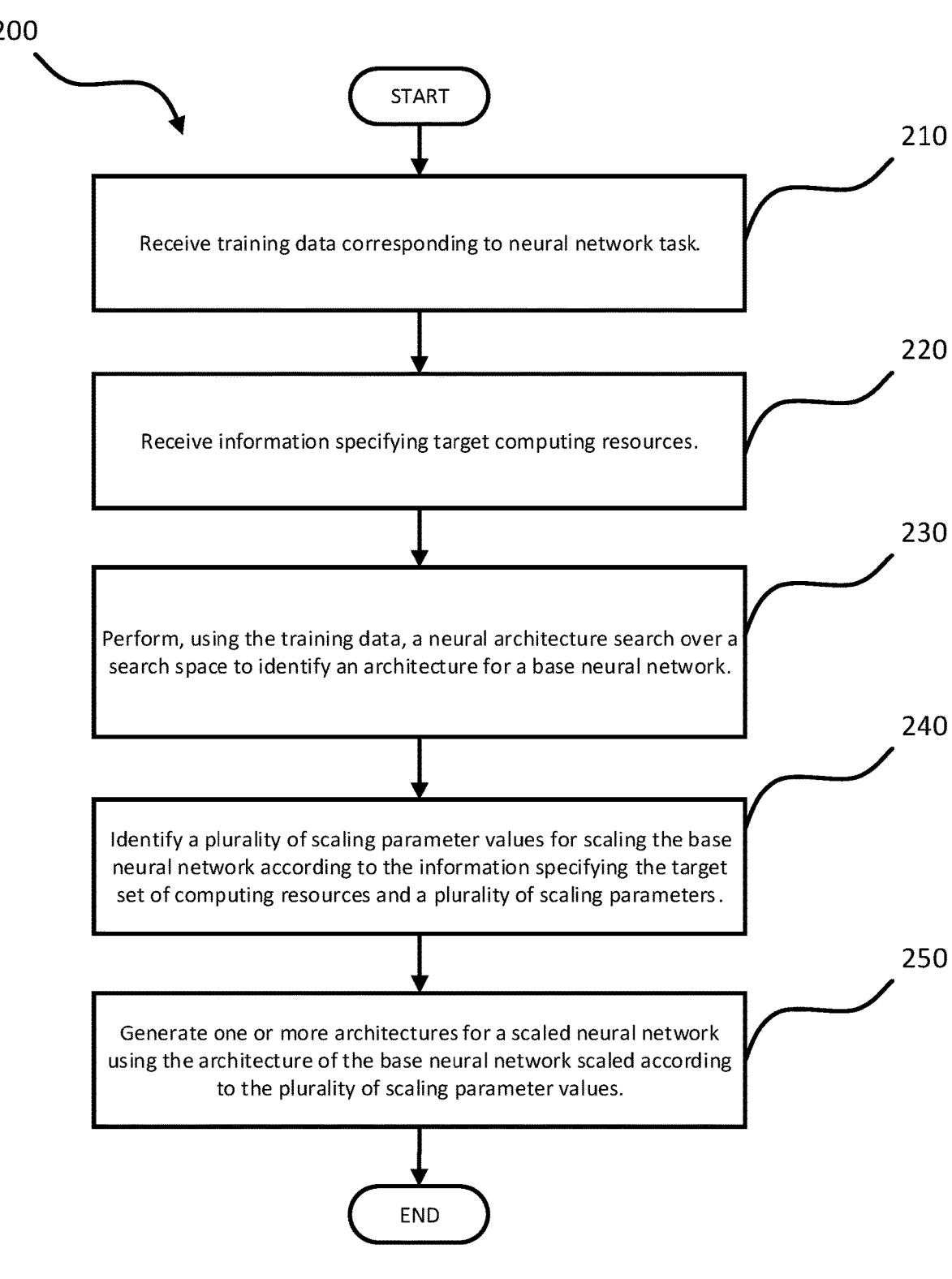

200

START

Receive training data corresponding to neural network task.

210

Receive information specifying target computing resources.

220

Perform, using the training data, a neural architecture search over a search space to identify an architecture for a base neural network.

230

Identify a plurality of scaling parameter values for scaling the base neural network according to the information specifying the target set of computing resources and a plurality of scaling parameters.

240

Generate one or more architectures for a scaled neural network using the architecture of the base neural network scaled according to the plurality of scaling parameter values.

250

END

FIG. 2

NEURAL ARCHITECTURE SCALING FOR HARDWARE ACCELERATORS

CROSS-REFERENCE TO RELATED APPLICATIONS

This application claims the benefit under 35 U.S.C. § 119(e) of U.S. Patent Application No. 63/137,926 filed on Jan. 15, 2021, the disclosure of which is incorporated here by reference.

BACKGROUND

Neural networks are machine learning models that include one or more layers of nonlinear operations to predict an output for a received input. In addition to an input layer and an output layer, some neural networks include one or more hidden layers. The output of each hidden layer can be input to another hidden layer or the output layer of the neural network. Each layer of the neural network can generate a respective output from a received input according to values for one or more model parameters for the layer. The model parameters can be weights or biases that are determined through a training algorithm to cause the neural network to generate accurate output.

BRIEF SUMMARY

A system implemented in accordance with aspects of the disclosure can reduce latency of a neural network architecture by searching through candidate neural network architectures according to each candidate's computational requirement (e.g., FLOPS), operational intensity and execution efficiency, together. Computational requirement, operational intensity, and execution efficiency are found to be attributed as a root cause of latency of a neural network on target computing resources, as opposed to computational requirement alone as affecting latency, including latency at inference, as described herein. Aspects of the disclosure provide for techniques of performing neural architecture search and scaling, such as by latency-aware compound scaling and by augmenting the space in which candidate neural networks are searched from based on this observed relationship between latency and computation, operational intensity, and execution efficiency.

Further, the system can perform compound scaling to scale multiple parameters of the neural network uniformly and according to multiple objectives, which can result in improved performance of the scaled neural network over approaches in which a single objective is considered, or approaches in which scaling parameters for a neural network are searched for separately. Latency-aware compound scaling can be used to quickly build a family of neural network architectures, scaled according to different values from an initial scaled neural network architecture, and which can be suitable for different use cases.

According to aspects of the disclosure, one computer-implemented method includes a method for determining an architecture for a neural network, including receiving, by one or more processors, training data corresponding to a neural network task and information specifying target computing resources; performing, by the one or more processors, using the training data and in accordance with a plurality of first objectives, a neural architecture search over a search space to identify an architecture for a base neural network; identifying, by the one or more processors, a plurality of scaling parameter values for scaling the base neural network according to the information specifying the target computing resources and a plurality of scaling parameters for the base neural network. The identifying can include repeatedly performing the following: selecting a plurality of candidate scaling parameter values, and determining a measure of performance for the base neural network scaled according to the plurality of candidate scaling parameter values, wherein the measure of performance is determined in accordance with a plurality of second objectives including a latency objective. The method can include generating, by the one or more processors, an architecture for a scaled neural network using the architecture of the base neural network scaled according to the plurality of scaling parameter values.

The foregoing and other implementations can each optionally include one or more of the following features, alone or in combination.

The plurality of first objectives for performing the neural architecture search can be the same as the plurality of second objectives for identifying the plurality of scaling parameter values.

The plurality of first objectives and the plurality of second objectives can include an accuracy objective corresponding to the accuracy of output of the base neural network.

The measure of performance can correspond at least in part with a measure of latency between the base neural network receiving an input and generating an output when the base neural network is scaled according to the plurality of candidate scaling parameter values and deployed on the target computing resources.

The latency objective can correspond to a minimal latency between the base neural network receiving an input and generating an output when the base neural network is deployed on the target computing resources.

The search space can include candidate neural network layers, each candidate neural network layer configured to perform one or more respective operations. The search space can include candidate neural network layers including different respective activation functions.

The architecture of the base neural network can include a plurality of components, each component having a respective plurality of neural network layers. The search space can include a plurality of candidate components of candidate neural network layers, including a first component of candidate network layers including a first activation function and a second component of candidate network layers including a second activation function different from the first activation function.

The information specifying the target computing resources can specify one or more hardware accelerators; and wherein the method further includes executing the scaled neural network on the one or more hardware accelerators to perform the neural network task.

The target computing resources can include first target computing resources, the plurality of scaling parameter values are a plurality of first scaling parameter values, and the method can further include: receiving, by the one or more processors, information specifying second target computing resources different from the first target computing resources, and identifying a plurality of second scaling parameter values for scaling the base neural network according to the information specifying the second target computing resources, wherein the plurality of second scaling parameter values are different from the plurality of first scaling parameter values.

The plurality of scaling parameter values are a plurality of first scaling parameter values, and wherein the method further includes: generating a scaled neural network architecture from the base neural network architecture scaled using a plurality of second scaling parameter values, wherein the second scaling parameter values are generated as a function of the plurality of first scaling parameter values and one or more compound coefficients uniformly modifying the value of each of the first scaling parameter values.

The base neural network can be a convolutional neural network, and wherein the plurality of scaling parameters can include one or more of a depth of the base neural network, a width of the base neural network, and a resolution of input for the base neural network.

According to another aspect, a method for determining an architecture for a neural network, includes: receiving, by one or more processors, information specifying target computing resources; receiving, by the one or more processors, data specifying an architecture for a base neural network; identifying, by the one or more processors, a plurality of scaling parameter values for scaling the base neural network according to the information specifying the target computing resources and a plurality of scaling parameters for the base neural network. The identifying can include repeatedly performing the following: selecting a plurality of candidate scaling parameter values, and determining a measure of performance for the base neural network scaled according to the plurality of candidate scaling parameter values, wherein the measure of performance is determined in accordance with a plurality of objectives comprising a latency objective; and generating, by the one or more processors, an architecture for a scaled neural network using the architecture of the base neural network scaled according to the plurality of scaling parameter values.

The plurality of objectives can be a plurality of second objectives; and receiving the data specifying the architecture for the base neural network can include: receiving, by one or more processors, training data corresponding to a neural network task, and performing, by the one or more processors, using the training data and in accordance with a plurality of first objectives, a neural architecture search over a search space to identify the architecture for the base neural network.

Other implementations include computer systems, apparatus, and computer programs recorded on one or more computer storage devices, each configured to perform actions of the methods.

BRIEF DESCRIPTION OF THE DRAWINGS

FIG. 2 is a flow diagram of an example process for generating scaled neural network architectures for execution on target computing resources.

DETAILED DESCRIPTION

Overview

Figure 1:
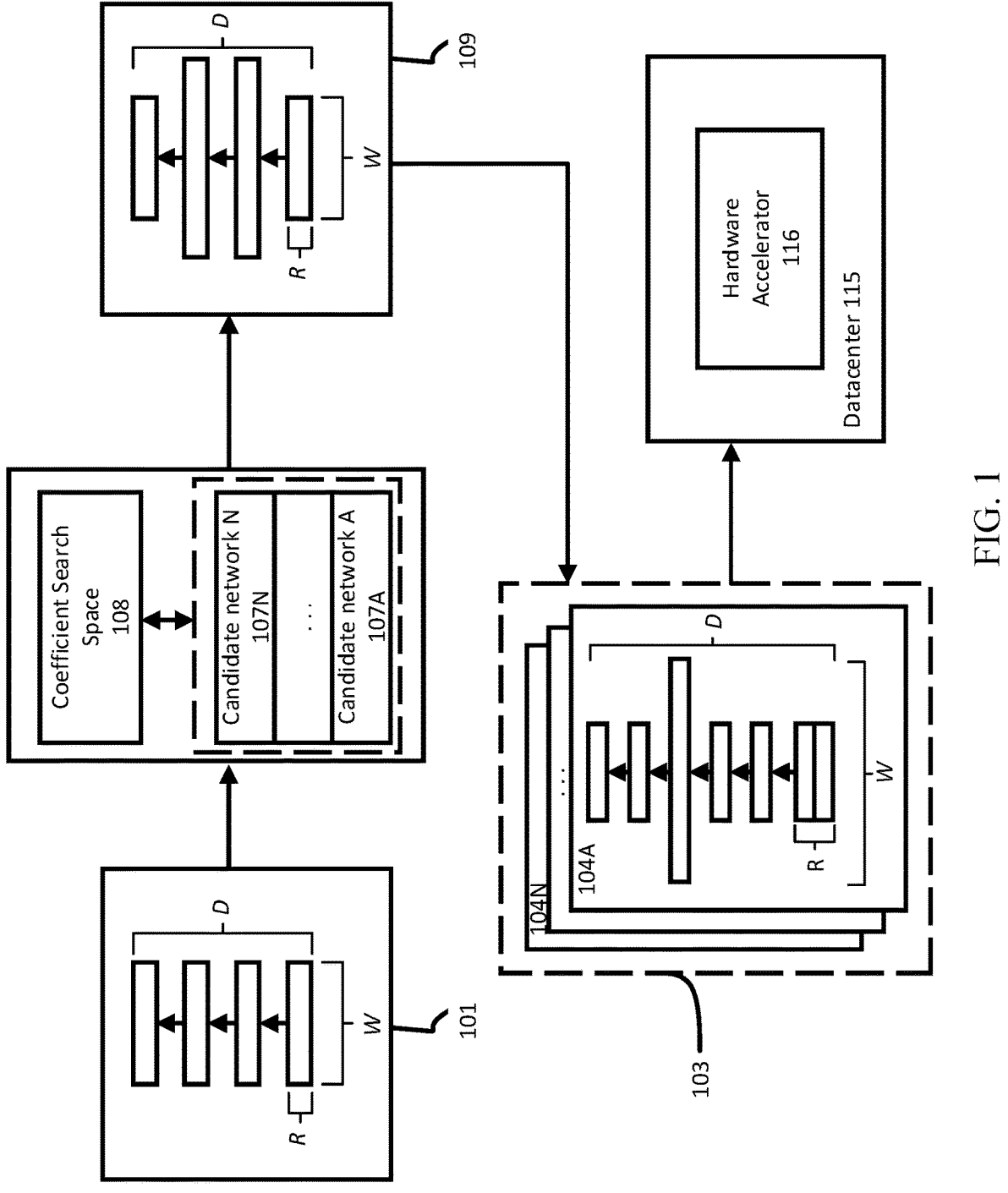
FIG. 1 is a block diagram illustrating a family of scaled neural network architectures for deployment in a datacenter housing hardware accelerator on which the deployed neural networks will execute.

The technology described in this specification generally relates to scaling neural networks for execution on different target computing resources, such as different hardware accelerators. Neural networks can be scaled according to multiple different performance objectives, which can include separate objectives for minimizing processing time, referred to herein as latency, and maximizing accuracy of the neural network when scaled for execution on target computing resources.

Generally, neural architecture search (NAS) systems can be deployed for selecting a neural network architecture from a given search space of candidate architectures, according to one or more objectives. One common objective is accuracy of the neural network—generally a system implementing a NAS technique will favor networks that result in higher accuracy after training, over networks with lower accuracy. After a base neural network is selected following a NAS, the base neural network can be scaled according to one or more scaling parameters. Scaling can include searching for the one or more scaling parameter values for scaling the base neural network, for example by searching for the scaling parameters in a coefficient search space of numbers. Scaling can include increasing or decreasing how many layers a neural network has, or the size of each layer, to make efficient use of the computational and/or memory resources available for deploying the neural network.

A commonly held belief related to neural architecture search and scaling is that the computation requirement a network, measured, for example, in floating-point operations per second (FLOPS), required to process input through a neural network is proportional to the latency between sending an input to the network and receiving an output. In other words, a neural network with a low computation (low FLOPS) requirement is believed to generate output faster than if the network had a higher computation (high FLOPS) requirement, because fewer operations are performed overall. Thus, many NAS systems select neural networks with a low computation requirement. However, it has been determined that the computation requirement to latency relationship is non-proportional, as other characteristics of the neural network, such as operational intensity, parallelism, and execution efficiency may affect the overall latency of a neural network.

The technology described herein provides for latency-aware compound scaling (LACS) and augmentation of the candidate neural network search space from which a neural network is selected. In the context of augmenting a search space, operations and architectures can be included in the search space that are "hardware accelerator friendly," in that these additions can result in higher operational intensity, execution efficiency, and parallelism suitable for deployment on various types of hardware accelerators. Such operations can include space-to-depth operations, space-to-batch operations, fused convolution structures, and component-wise search activation functions.

Latency-aware compound scaling of neural networks can improve scaling of neural networks over conventional approaches that do not optimize according to latency. Instead, LACS may be used to identify scaled parameter values for scaled neural networks that are both accurate and operate with low latency on the target computing resources.

The technology further provides for multi-objective scaling that share objectives for searching for a neural architecture using NAS or similar techniques. Scaled neural networks can be identified according to the same objectives used in searching for the base neural network. As a result, the scaled neural network can be optimized for performance at two stages—base architecture searching and scaling—rather than treating each stage as tasks with separate objectives.

LACS can be integrated with existing NAS systems, at least because the same objectives for both search and scaling can be used to create an end-to-end system for determining scaled neural network architectures. Further, a family of scaled neural network architectures can be identified faster than searching-without-scaling approaches, in which neural network architectures are searched for but not scaled for deployment on target computing resources.

The technology described herein may provide for improved neural networks as compared with neural networks identified in conventional search-and-scaling approaches that do not use LACS. In addition, a family of neural networks with different trade-offs between objectives like model accuracy and inference latency can be quickly generated for application in a variety of use cases. Moreover, the technology may provide faster identification of neural networks for performing particular tasks, but the identified neural networks may perform with improved accuracy over neural networks identified using other approaches. This is at least because neural networks identified as a result of the searching and scaling as described herein may account for characteristics like operational intensity and execution efficiency that may affect latency, as opposed to merely a network's computational requirement. In this way, a neural network identified can perform faster at inference while not sacrificing network accuracy.

The technology may further provide for a generally applicable framework for quickly migrating existing neural networks to improved computing resource environments. For example, LACS and NAS as described herein can be applied when the execution of an existing neural network selected for a datacenter having particular hardware is migrated to a datacenter using different hardware. In this regard, a family of neural networks can be quickly identified for performing the task of the existing neural network, and deployed on the hardware of the new datacenter. This application can be particularly useful in areas of rapid development requiring state-of-the-art hardware for efficient execution, such as networks executing tasks in computer vision or other image processing tasks.

FIG. 1 is a block diagram illustrating a family 103 of scaled neural network architectures 104A-N for deployment in a datacenter 115 housing hardware accelerator 116 on which the deployed neural networks will execute. The hardware accelerator 116 can be any type of processor, such as a CPU, GPU, FGPA, or ASIC such as a TPU. According to aspects of this disclosure, the family 103 of scaled neural network architectures can be generated from a base neural network architecture 101.

An architecture for a neural network refers to characteristics defining the neural network. For instance, the architecture may include the characteristics of a plurality of different neural network layers for the network, how the layers process input, how the layers interact with one another, etc. For example, an architecture for a convolutional neural network (ConvNet) can define a discrete convolution layer that receives input image data, followed by a pooling layer, followed by a fully connected layer that generates an output in accordance with a neural network task, e.g., classifying the contents of the input image data. The architecture of a neural network can also define types of operations performed within each layer. For example, the architecture of a ConvNet may define that ReLU activation functions are used in the fully-connected layer of the network.

The base neural network architecture 101 can be identified according to a set of objectives and using NAS. The base neural network architecture 101 can be identified from a search space of candidate neural network architectures according to the set of objectives and using NAS. As described in more detail herein, the search space of candidate neural network architectures can be augmented to include different network components, operations, and layers from which a base network satisfying the objectives can be identified.

The set of objectives used for identifying the base neural network architecture 101 can also be applied to identify scaling parameter values for each neural network 104A-N in the family 103. The base neural network architecture 101 and the scaled neural network architectures 104A-N can be characterized by a number of parameters, with these parameters being scaled to varying degrees in the scaled neural network architectures 104A-N. In FIG. 1, the neural networks 101, 104A are shown with three scaling parameters: D indicating the number of layers in the neural network; W indicating the width or number of neurons within a neural network layer; and R indicating the size of input processed by the neural network at a given layer.

As described in more detail herein, a system configured to perform LACS can search a coefficient search space 108 to identify multiple sets of scaling parameter values. Each scaling parameter value is a coefficient in the coefficient search space, which for example can be a set of positive real numbers. Each candidate network 107A-N is scaled from the base neural network 101 according to candidate coefficient values identified as part of a search in the coefficient search space 108. The system can apply any of a variety of different search techniques for identifying candidate coefficients, such as Pareto frontier search, or grid search. For each candidate network 107A-N, the system can evaluate a measure of performance for the candidate network in performing a neural network task. The measure of performance can be based on multiple objectives, including a latency objective for measuring the latency of a candidate network between receiving an input and generating a corresponding output as part of performing a neural network task.

After the scaling parameter value search is performed on the coefficient search space 108, the system can receive a scaled neural network architecture 109. The scaled neural network architecture 109 is scaled from the base neural network 101, with scaling parameter values resulting in the highest measure of performance of the candidate networks 107A-N identified during the search in the coefficient search space.

From the scaled neural network architecture 109, the system can generate the family 103 of scaled neural network architectures 104A-N. The family 103 can be generated by scaling the scaled neural network architecture 109 according to different values. Each scaling parameter value for the scaled neural network architecture 109 can be scaled uniformly to generate a different scaled neural network architecture in the family 103. For example, each scaling parameter value for the scaled neural network architecture 109 can be scaled by raising each scaling parameter value by a factor of 2. The scaled neural network architecture 109 can be scaled for different values—or "compound coefficients"—that are applied uniformly to each scaling parameter value of the scaled neural network architecture 109. In some implementations, the scaled neural network architecture 109 is scaled in other ways, e.g., by scaling each scaling parameter value separately, to generate a scaled neural network architecture in the family 103.

By scaling the scaled neural network architecture 109 according to different values, different neural network architectures can be quickly generated for performing a task according to a variety of different use cases. The different use cases can be specified as different trade-offs between the multiple objectives used to identify the scaled neural network architecture 109. For example, one scaled neural network architecture can be identified as meeting a higher threshold for accuracy, at the cost of higher latency during execution. Another scaled neural network architecture can be identified as meeting a lower threshold for accuracy, but can be executed with lower latency on the hardware accelerator 116. Another scaled neural network architecture can be identified that balances the trade-offs between accuracy and latency on the hardware accelerator 116.

As an example, for performing a computer vision task, such as object recognition, a neural network architecture may need to generate output in real-time or near real-time, as part of an application continuously receiving video or image data and task to identify a particular class of object in the received data. In this example task, the tolerance for accuracy may be lower, therefore a scaled neural network architecture scaled with appropriate trade-offs for lower latency and lower accuracy may be deployed to perform the task.

As another example, a neural network architecture may be tasked to classify every object in a received scene from image or video data. In this example, a scaled neural network with higher accuracy at the cost of latency may be deployed, if latency in performing this example task is not considered as important as performing the task accurately. In other examples, scaled neural network architectures balancing trade-offs between accuracy, latency, and other objectives may be deployed where a particular trade-off is not identified or desired in performing the neural network task.

The scaled neural network architecture 104N is scaled with scaling parameter values different from those used to scale the scaled neural network architecture 109 to obtain the scaled neural network 104A, and may represent a different use case, e.g., one in which accuracy is desired over latency at inference.

The LACS and NAS technology described herein can generate the family 103 for the hardware accelerator 116, and receive additional training data and information specifying multiple different computing resources, such as different types of hardware accelerators. In addition to generating the family 103 for the hardware accelerator 116, the system can search for a base neural network architecture, and generate a family of scaled neural network architectures for a different hardware accelerator. For example, given a GPU and a TPU, the system can generate separate model families optimized for accuracy-latency tradeoffs for the GPU and TPU, respectively. In some implementations, the system can generate multiple scaled families from the same base neural network architecture.

Example Methods

FIG. 2 is a flow diagram of an example process 200 for generating scaled neural network architectures for execution on target computing resources. The example process 200 can be performed on a system of one or more processors in one or more locations. For example, a neural architecture search—latency-aware compound scaling (NAS-LACS) system as described herein, can perform the process 200.

As shown in block 210, the system receives training data corresponding to a neural network task. A neural network task is a machine learning task that can be performed by a neural network. The scaled neural network can be configured to receive any type of data input to generate output for performing a neural network task. As examples, the output can be any kind of score, classification, or regression output based on the input. Correspondingly, the neural network task can be a scoring, classification, and/or regression task for predicting some output given some input. These tasks can correspond to a variety of different applications in processing images, video, text, speech, or other types of data.

The training data received can be in any form suitable for training a neural network, according to one of a variety of different learning techniques. Learning techniques for training a neural network can include supervised learning, unsupervised learning, and semi-supervised learning techniques. For example, the training data can include multiple training examples that can be received as input by a neural network. The training examples can be labeled with a known output corresponding to output intended to be generated by a neural network appropriately trained to perform a particular neural network task. For example, if the neural network task is a classification task, the training examples can be images labeled with one or more classes categorizing subjects depicted in the images.

As shown in block 220, the system receives information specifying target computing resources. The target computing resources data can specify characteristics for computing resources on which a neural network can be at least partially deployed. Computing resources can be housed in one or more datacenters or other physical locations hosting any of a variety of different types of hardware devices. Example types of hardware include central processing units (CPUs), graphics processing units (GPUs), edge or mobile computing devices, field programmable gate arrays (FGPAs) and various types of application-specific circuits (ASICs).

Some devices can be configured for hardware acceleration, which can include devices configured for efficiently performing certain types of operations. These hardware accelerators, which can for example include GPUs and tensor processing units (TPUs) can implement special features for hardware acceleration. Example features for hardware acceleration can include configuration to perform operations commonly associated with machine learning model execution, such as matrix multiplication. These special features can also include, as examples, matrix-multiply-and-accumulate units available in different types of GPUs, as well as matrix multiply units, available in TPUs.

The target computing resources data can include data for one or more target sets of computing resources. A target set of computing resources can refer to a collection of computing devices on which a neural network is desired to be deployed over. Information specifying the target set of computing resources can refer to the type and quantity of hardware accelerators or other computing devices in the target set. The target set can include devices of the same or different types. For example, a target set of computing resources can define hardware characteristics and quantity for a particular type of hardware accelerator, including its processing capability, throughput, and memory capacity. As described herein, a system may generate families of scaled neural network architectures for each device specified in the target set of computing resources.

In addition, the target computing resources data can specify different target sets of computing resources, reflecting for example different potential configurations of computing resources housed in a data center. From this training and target computing resources data, the system can generate a family of neural network architectures. Each architecture can be generated from a base neural network identified by the system.

As shown in block 230, the system may, using the training data, perform a neural architecture search over a search space to identify an architecture for a base neural network. The system may use any of a variety of NAS techniques, such as techniques based on reinforcement learning, evolutionary search, or differentiable search. In some implementations, the system may receive data specifying an architecture for a base neural network directly, e.g., without receiving training data and performing NAS as described herein.

A search space refers to candidate neural networks or portions of candidate neural networks that can potentially be selected as part of a base neural network architecture. A portion of a candidate neural network architecture can refer to a component for the neural network. The architecture of a neural network can be defined according to a plurality of components for the neural network, in which each component includes one or more neural network layers. Characteristics for neural network layers can be defined in an architecture at the component-level, meaning that the architecture can define certain operations performed in the component, such that each neural network in the component implements the same operations defined for the component. The component can also be defined in the architecture by the number of layers in the component.

As part of performing the NAS, the system can repeatedly identify candidate neural networks, obtain performance metrics corresponding to multiple objectives, and evaluate the candidate neural networks according to their respective performance metrics. As part of obtaining the performance metrics, such as metrics for accuracy and latency of the candidate neural network, the system can train the candidate neural network using the received training data. Once trained, the system can evaluate the candidate neural network architecture to determine its performance metrics, and compare the performance metrics according to a current best candidate.

The system can repeatedly perform this process of search by selecting a candidate neural network, training the network, and comparing its performance metrics, until reaching stopping criteria. The stopping criteria can be a minimum predetermined threshold of performance met by a current candidate network. The stopping criteria in addition or alternatively can be a maximum number of search iterations, or a maximum amount of time allocated for performing the search. The stopping criteria can be a condition in which performance of the neural network converges, e.g., the performance of a subsequent iteration is less than a threshold different from the performance of the previous iteration.

In the context of optimizing different performance metrics for the neural network, e.g., accuracy and latency, the stopping criteria can specify threshold ranges predetermined to be "optimal." For example, a threshold range for optimal latency can be a threshold range from a theoretical or measured minimum latency achieved by the target computing resources. The theoretical or measured minimum latency can be based on physical characteristics of the computing resources, such as the minimum amount of time necessary for components of the computing resources to be able to physically read and process incoming data. In some implementations, latency is held as an absolute minimum, e.g., as close to zero delay as physically possible, and is not based on a target latency measured or calculated from the target computing resources.

The system can be configured to use a machine learning model or other technique for selecting the next candidate neural network architecture, where the selection can be based at least in part on learned characteristics for the different candidate neural networks that are more likely to perform well under the objectives for a particular neural network task.

In some examples, the system may use a multi-objective reward mechanism for identifying the base neural network architecture, as follows:

$$ACCURACY(m) \times \left[\frac{LATENCY(m)}{Target}\right]^w \tag{1}$$

ACCURACY(m) is the performance metric for the accuracy of a candidate neural network m and LATENCY(m) is the latency of the neural network in generating an output on target computing resources. Accuracy and latency, as described in more detail herein, can also be objectives used by the system as part of scaling the base neural network architecture in accordance with characteristics of the target computing resources. The Target is a target latency value, for example measured in milliseconds, and can be predetermined. The value w is a tunable parameter for weighting the impact of network latency on the overall performance of the candidate neural network. Different values w can be learned or tuned according to different target sets of computing resources. As an example, w can be set to −0.09, reflecting an overall larger factor applicable to computing resources like TPUs and GPUs that are less sensitive to latency variations, than for example mobile platforms (where w may be set to a smaller value, such as −0.07).

To measure the accuracy of a candidate neural network, the system can use the training set to train the candidate neural network to perform a neural network task. The system can split the training data into a training set and a validation set, for example according to an 80/20 split. For example, the system can apply a supervised learning technique to calculate an error between output generated by the candidate neural network, with a ground-truth label of a training example processed by the network. The system can use any of a variety of loss or error functions appropriate for the type of the task the neural network is being trained for, such as cross-entropy loss for classification tasks, or mean square error for regression tasks. The gradient of the error with respect to the different weights of the candidate neural network can be calculated, for example using the backpropagation algorithm, and the weights for the neural network can be updated. The system can be configured to train the candidate neural network until stopping criteria are met, such as a number of iterations for training, a maximum period of time, convergence, or when a minimum accuracy threshold is met.

The system can generate performance metrics for the accuracy and latency of the candidate neural network architecture on the target computing resources, in addition to other performance metrics, including (i) operational intensity of the candidate base neural network when deployed on the target computing resources, and/or an execution efficiency of the candidate base neural network on the target computing resources. In some implementations, the measure of performance of the candidate base neural network is based at least in part on its operational intensity and/or the execution efficiency, in addition to accuracy and latency.

Latency, operational intensity, and execution efficiency can be defined as follows:

$$\text{LATENCY} = \frac{W}{C} = \frac{W}{C_{ideal} \times E}, \quad E = \frac{C}{C_{ideal}}, \quad (3)$$

$$C_{ideal} = \begin{cases} I \times b & \text{if } I < R \\ C_{max} & \text{else} \end{cases}, I = \frac{W}{Q}$$

In (3), LATENCY is defined as $$\frac{W}{C},$$

where W is the amount of computation (e.g., in FLOPS) for executing the neural network architecture being measured, and C is the computation rate achieved by the target computing resources processing input on the neural network architecture (e.g., measured in FLOPS/sec). E is the execution efficiency of the execution of the candidate neural network on the target computing resources, and E can be equal to $C/C_{ideal}$ (and therefore, by algebra, $C \times C_{ideal} = E$). $C_{ideal}$ is the ideal computation rate achieved on the target computing resources for executing the neural network architecture being measured. $C_{ideal}$ is defined according to the operational intensity I, the memory bandwidth of the target computing resources b, and $C_{max}$, which represents the peak computation rate for the target computing resources (e.g., peak computation rate for a GPU).

$C_{max}$ and b are constants and correspond to hardware characteristics of the target computing resources, e.g., its peak computation rate and memory bandwidth, respectively. Operational intensity I refers to a measurement for the amount of data processed by computing resources deploying a neural network, given the amount of computation W required by the neural network to execute, divided by the memory traffic Q incurred by the computing resources during the execution of the neural network $$\left( I = \frac{W}{Q}, \right.$$

as shown in (3)).

The ideal computation rate for executing the neural network on the target computing resources is I×b when I<R, and $C_{max}$ otherwise. R is the ridge point, or the minimum operational intensity required of the neural network architecture to achieve the peak computation rate on the target computing resources.

Together, (3) and the corresponding description show that the latency at inference of a measured neural network is a function of operational intensity I, computation W, and execution efficiency E, instead of merely computation W alone. In the context of hardware accelerators, particularly hardware accelerators like TPUs and GPUs commonly deployed in datacenters, this relationship can be applied to augment a candidate neural network search space with "accelerator-friendly operations" during NAS, as well as improve how a base neural network is selected and subsequently scaled by the system.

The system can search for the base neural network architecture by simultaneously searching for candidate neural network architectures with improved operational intensity, execution efficiency, and computation requirement to improve latency of a final neural network, instead of searching to find reduced computation networks alone. The system can be configured to operate in this manner to reduce overall latency of the final base neural network architecture.

In addition, the candidate architecture search space from which the system selects the base neural network architecture can be augmented to expand the range of available candidate neural networks more likely to perform accurately and with reduced inference latency on the target computing resources, particularly in the case in which the target computing resources are datacenter hardware accelerators.

Augmenting the search space as described can increase the number of candidate neural network architectures that are more suited for datacenter accelerator deployment, which can result in an identified base neural network architecture that may not have been a candidate in a search space not augmented according to aspects of the disclosure. In the examples in which the target computing resources specifies hardware accelerators like GPUs and TPUs, the search space can be augmented with candidate architectures or portions of architectures such as components or operations that promote operational intensity, parallelism, and/or execution efficiency.

In one example manner of augmentation, the search space can be augmented to include neural network architecture components with layers implementing one of a variety of different types of activation functions. In the case of TPUs and GPUs, it has been found that activation functions, such ReLU or swish, are typically of low operational intensity and are instead usually memory-bound on hardware accelerators of these types. Because execution of activation functions in a neural network are generally bound by the total amount of memory available on the target computing resources, execution of these functions can have large negative performance impact to the end-to-end network inference speed.

One example augmentation to the search space vis-à-vis activation functions is to introduce to the search space activation functions fused with their associated discrete convolutions. Because activation functions are generally element-wise operations and run on units of hardware accelerators configured for vector operations, the execution of these activation functions can be performed in parallel with discrete convolutions, which are typically matrix-based operations operating on matrix units for a hardware accelerator. These fused activation function-convolution operations can be selectable as a candidate neural network component by the system, as part of searching for a base neural network architecture as described herein. Any of a variety of different activation functions can be used, including Swish, ReLU (Rectified Linear Unit), Sigmoid, Tanh, and Softmax.

Different components that include layers of fused activation function-convolution operations can be added to the search space and can vary by the type of activation function employed. For example, one component of layers of activation function-convolutions can include the ReLU activation function, while another component can include the Swish activation function. It has been found that different hardware accelerators may perform more efficiently using different activation functions, therefore augmenting the search space to include fused activation function-convolutions of multiple types of activation functions can further improve identifying a base neural network architecture best suited for performing the neural network task in question.

The search space can also be augmented with other fused convolution structures, in addition to the components described herein with various different activation functions, to further enrich the search space with convolutions of different shapes, types, and sizes. Different convolution structures can be components added as part of a candidate neural network architecture, and can include expansion layers of 1×1 convolutions, depth-wise convolutions, projection layers of 1×1 convolutions, as well as other operations, such as activation functions, batch normalization functions, and/or skip-connections.

Identifying the root cause of the non-proportional relationship between computation requirement and latency as described herein also demonstrates the impact of parallelism on hardware accelerators. Parallelism can be critical for neural networks implemented on hardware accelerators like GPUs and TPUs, because these hardware accelerators can require large parallelism to achieve high performance. For example, a convolution operation for a neural network layer needs to have adequately sized depth, batch, and spatial dimensions to provide enough parallelism to achieve high execution efficiency E on matrix units for the hardware accelerator. Execution efficiency as described with reference to (3) forms part of the full picture of factors affecting network latency at inference.

Therefore, the search space for NAS can be augmented in other ways to include operations that can take advantage of the parallelism available on a hardware accelerator. The search space can include one or more operations to fuse depth-wise convolutions with adjacent 1×1 convolutions, and operations for reshaping the input of a neural network. For example, input to a candidate neural network can be a tensor. A tensor is a data structure that can represent values according to different orders. For example, a first-order tensor can be a vector, a second-order tensor can be a matrix, and a third-order matrix can be a three-dimensional matrix, and so on. Fusing depth-wise convolutions can be beneficial because depth-wise operations generally are of a lower operational intensity, and fusing the operations with adjacent convolutions can increase the operational intensity closer to max capability of a hardware accelerator.

The search space can also include operations that reshape an input tensor by changing different dimensions of the tensor. For example, if a tensor has a depth, width, and height dimension, one or more operations in the search space that can form part of a candidate neural network architecture can be configured to change one or more of the depth, width, and resolution dimensions of the tensor. In one example, the search space can be augmented with one or more space-to-depth convolutions (such as 2×2 convolutions) that reshape input tensors by increasing the depth of the input tensor, while decreasing other dimensions of the input tensor. In some implementations, one or more operations are included that use stride-n n×n convolutions, where n represents a positive integer that the system can use to reshape a tensor input. For example, if a tensor input to a candidate neural network is H×W C, the one or more added operations can reshape the tensor to a dimension of $$\frac{H}{n} \times \frac{W}{n} \times n^2 C.$$

Implementing space-to-depth convolutions as described above can have at least two advantages. First, convolutions are associated with relatively high operational intensity and execution efficiency, and therefore more options in the search space for convolutions can enrich the search space overall in searching for a candidate neural network. High operational intensity and execution efficiency is also conducive for implementation on hardware accelerators such as TPUs and GPUs. Next, the stride n×n convolution can also be trained as part of the candidate neural network to contribute to the capacity of the neural network.

The search space can also include operations that reshape the input tensor by moving elements of the tensor to different locations in memory on the target computing resources. The operations in addition or alternatively may copy elements to different locations in memory.

In some implementations, the system is configured to receive a base neural network for scaling directly, and does not perform NAS or any other search for identifying the base neural network. In some implementations, multiple devices individually perform at least parts of the process 200, for example by identifying the base neural network on one device, and scaling the base neural network as described herein on another device.

The system may identify a plurality of scaling parameter values for scaling the base neural network according to the information specifying the target computing resources and a plurality of scaling parameters, as shown in block 240 of FIG. 2. The system can use latency-aware compound scaling, as described presently, for using accuracy and latency of a candidate scaled neural network as objectives for searching for scaling parameter values for the base neural network.

Generally, scaling techniques are applied in conjunction with NAS to identify a neural network that is scaled for deployment on target computing resources. Model scaling can be used in conjunction with NAS to more efficiently search for a family of neural networks that support a variety of different use cases. Under a scaling approach, different values for scaling parameters, such as the depth, width, and resolution of a neural network, can be searched for using a variety of different techniques. Scaling can be done by separately searching for values for each scaling parameter, or by searching for a uniform set of values for adjusting multiple scaling parameters, together. The former is sometimes referred to as simple scaling, and the latter is sometimes referred to as compound scaling.

Scaling techniques that use accuracy as the sole objective can result in neural networks not scaled for proper consideration of the performance/speed impact of these scaled networks when deployed on specialized hardware, such as datacenter accelerators. LACS, as described in more detail in FIG. 3, can use both accuracy and latency objectives, which can be shared as the same objectives used for identifying the base neural network architecture.

Figure 3:
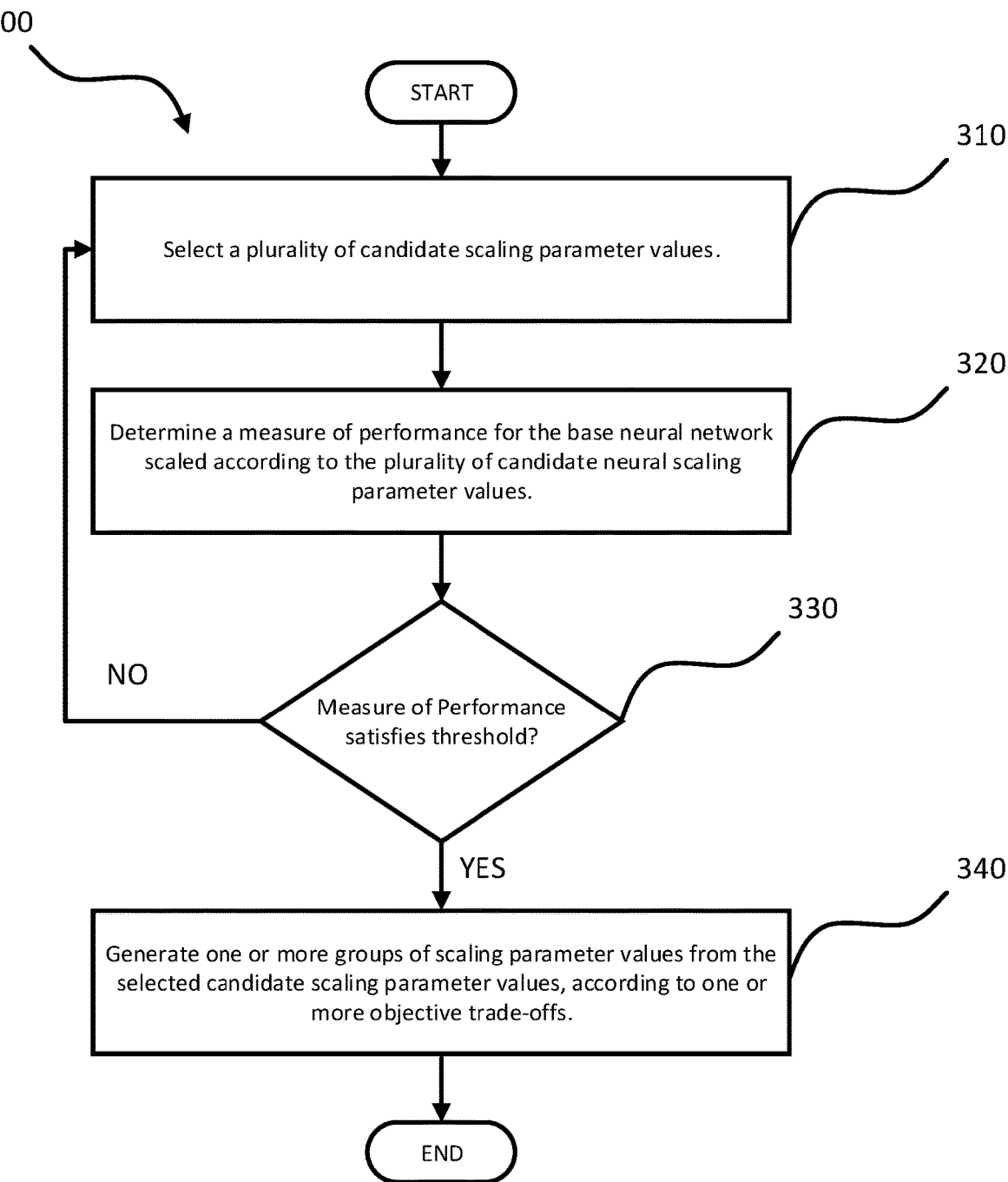
FIG. 3 is an example process for latency-aware compound scaling of a base neural network architecture.

FIG. 3 is an example process 300 for latency-aware compound scaling of a base neural network architecture. The example process 300 can be performed on a system or device of one or more processors in one or more locations. For example, the process 300 can be performed on a NAS-LACS system as described herein.

As shown in block 310, the system selects a plurality of candidate scaling parameter values. Scaling parameter values are values for different scaling parameters of a neural network. As described herein, depth, width, and resolution of input can be scaling parameters, at least because those parameters of a neural network can be changed larger or smaller. As part of selecting scaling parameter values, the system can select a tuple of scaling coefficients from a coefficient search space. The coefficient search space includes candidate scaling coefficient tuples from which scaling parameter values for a neural network can be determined. The number of scaling coefficients for each tuple can depend on the number of scaling parameters. For example, if the scaling parameters are depth, width, and resolution, then the coefficient search space will include candidate tuples of the form $(\alpha, \beta, \gamma)$, having three scaling coefficients each. The coefficients in each tuple can be numerical values, e.g., integer or real-valued.

In a compound scaling approach, the scaling coefficients for each scaling parameter are searched for together. The system can apply any of a variety of different search techniques for identifying a tuple of coefficients, such as Pareto frontier search, or grid search. However the system searches for the tuple of coefficients, the system can search for the tuple according to the same objectives used to identify the base neural network architecture described herein with reference to FIG. 2. In addition, the multiple objectives can include both accuracy and latency, which can be expressed as:

$$\text{ACCURACY}(m_{scaled}) \times \left[\frac{\text{LATENCY}(m_{scaled})}{\text{Target}}\right]^w \quad (2)$$

While the objectives between the NAS performed to identify the base neural architecture (shown at (1), herein) are the same as the objectives shown in (2), a key difference in computing performance metrics under (2) is that the candidate scaled neural network $m_{scaled}$ is evaluated instead of the base neural network m. The overall objective of the system can be to identify scaling parameter values that are in Pareto-balance of each of the multiple objectives, e.g., accuracy and latency.

Put another way, the system determines a measure of performance for the base neural network scaled according to the plurality of candidate neural scaling parameter values, as shown in block 320. The system determines a measure of performance for the base neural network according to different performance metrics reflecting the performance of the candidate scaled neural network scaled from the candidate neural network scaling parameter values.

The base neural network architecture is scaled by its scaling parameters according to the tuple of scaling coefficients searched for in the coefficient search space. The ACCURACY($m_{scaled}$) can be a measure of how accurate the candidate scaled neural network is on a validation set of examples obtained from the received training data. The LATENCY($m_{scaled}$) can be a measure of the time between receiving input and generating a corresponding output on the candidate scaled neural network when deployed on the target computing resources. In general, the system aims to maximize accuracy for a candidate neural network architecture, while minimizing latency.

Following the description in reference to (3), the system can directly or indirectly obtain performance metrics for operational intensity, computation requirement, and execution efficiency for the candidate scaled neural network. This is because LATENCY is a function of these three other potential performance metrics. Therefore, the system can be configured to search for candidate scaling parameter values that optimize for one or more of operational intensity, computation requirement, and execution efficiency, in addition to accuracy and latency of the scaled neural network architecture when deployed over the target computing resources.

As part of determining the measure of performance, the system can further train or tune the candidate scaled neural network architecture using receiving training data. The system can determine the measure of performance for the trained and scaled neural network, and determine whether the measure of performance satisfies a performance threshold, according to block 330. The measure of performance and the performance threshold can be a composite of multiple performance metrics and performance thresholds, respectively. For example, the system can determine a single measure of performance from metrics for both the accuracy and inference latency of the scaled neural network, or the system can determine separate performance metrics for the different objectives, and compare each metric with a corresponding performance threshold.

If the measure of performance meets the performance threshold, then the process 300 ends. Otherwise, the process continues, and the system selects a new plurality of candidate scaling parameter values, according to block 310. For example, the system can select a new tuple of scaling coefficients from the coefficient search space, based at least in part on the previously selected candidate tuple and its corresponding measure of performance. In some implementations, the system searches for multiple tuples of coefficients, and performs a more fine-grained search according to the multiple objectives in the neighborhood of each of the candidate tuples.

The system can implement any of a variety of different techniques for iteratively searching through the coefficient candidate space, for example using grid search, reinforcement learning, evolutionary search, and the like. The system can continue searching for scaling parameter values until reaching stopping criteria, such as convergence or a number of iterations, as described earlier.

In some implementations, the system can be tuned according to one or more controller parameter values, which can be hand-tuned, learned by a machine learning technique, or a combination of the two. The controller parameters can affect the relative impact of each objective on the overall measure of performance for a candidate tuple. In some examples, certain values or relationships between values in a candidate tuple may be favored or disfavored based on learned characteristics for ideal scaling coefficients at least partially reflected in the controller parameter values.

According to block 340, the system generates one or more groups of scaling parameter values from the selected candidate scaling parameter values, according to one or more objective trade-offs. Objective trade-offs represent different thresholds for each objective, e.g., accuracy and latency, and can be met by different scaled neural networks. For example, one objective trade-off may have a higher threshold for network accuracy, but a lower threshold for inference latency (i.e., more accurate network with higher latency). As another example, an objective trade-off may have a lower threshold for network accuracy, but a higher threshold for inference latency (i.e., less accurate network with lower latency). As another example, an objective trade-off may balance accuracy and latency performance.

For each objective trade-off, the system can identify a respective group of scaling parameter values that the system can use to scale the base neural network architecture to meet the objective trade-off. In other words, the system can repeat the selecting as shown in block 310, the determining the measure of performance as shown in block 320, and the determining whether the measure of performance meets the performance threshold as shown in block 330, with the difference between that the performance threshold is defined by the objective trade-off. In some implementations, rather than searching for tuples for the base neural network architecture, the system can search for candidate scaling coefficient tuples for the base neural network architecture scaled according to the selected candidate of scaling parameter values that satisfied the measure of performance for the multiple objectives initially, according to block 330.

In some implementations, after selecting the plurality of scaling parameter values and satisfying the measure of performance, the system can be configured to generate a family of neural networks by scaling the originally scaled neural network again. In other words, from a tuple of scaling coefficients ($\alpha$, $\beta$, $\gamma$), the system can scale the tuple, for example by a common factor, or "compound coefficient," to obtain tuples ($\alpha'$, $\beta'$, $\gamma'$) and ($\alpha''$, $\beta''$, $\gamma''$) for scaling the base neural network by other factors. In this approach, a model family can be quickly generated and can include different neural networks applicable to a variety of use cases.

For example, different neural networks in a family can be scaled according to one or more compound coefficients. Given a compound coefficient $\phi$ and a tuple of scaling coefficients ($\alpha$, $\beta$, $\gamma$), scaling parameters for a scaled neural network in a family can be defined by:

$$d = \alpha^{\phi}, w = \beta^{\phi} r = \gamma^{\phi}; s.t. \alpha \geq 1, \beta \geq 1, \gamma \geq 1 \qquad (4)$$

where d, w, r are scaling parameter values for depth, width, and resolution of the neural network, respectively. In the case of the first scaled neural network architecture, $\phi$ can be 1. Compound coefficients in general can represent the latency budget for network scaling, while $\alpha$, $\beta$, $\gamma$ control how the latency budget is allocated to the different scaling parameter values, respectively.

Returning to FIG. 2, the NAS-LACS system may generate one or more architectures for scaled neural networks using the architecture of the base neural network scaled according to the plurality of scaling parameter values, as shown in block 250. The scaled neural network architecture can be part of a family of neural networks generated from the base neural network architecture and different scaling parameter values.

If the information specifying target computing resources included one or more sets of multiple target computing resources, e.g., multiple different types of hardware accelerators, then the system can repeat the process 200 and process 300 for each hardware accelerator, to generate an architecture for a respective scaled neural network each corresponding to a target set. For each hardware accelerator, the system can generate a family of scaled neural network architectures, according to different target trade-offs between latency and accuracy, or latency, accuracy, and other objectives particularly, including operational intensity and execution efficiency, described herein with reference to (3).

In some implementations, the system can generate multiple families of scaled neural network architectures from the same base neural network architecture. This approach can be helpful in situations in which different target devices share similar hardware characteristics, and can result in identifying a corresponding scaled family for each device faster at least because the search for a base neural network architecture is only performed once.

Example Systems

Figure 4:
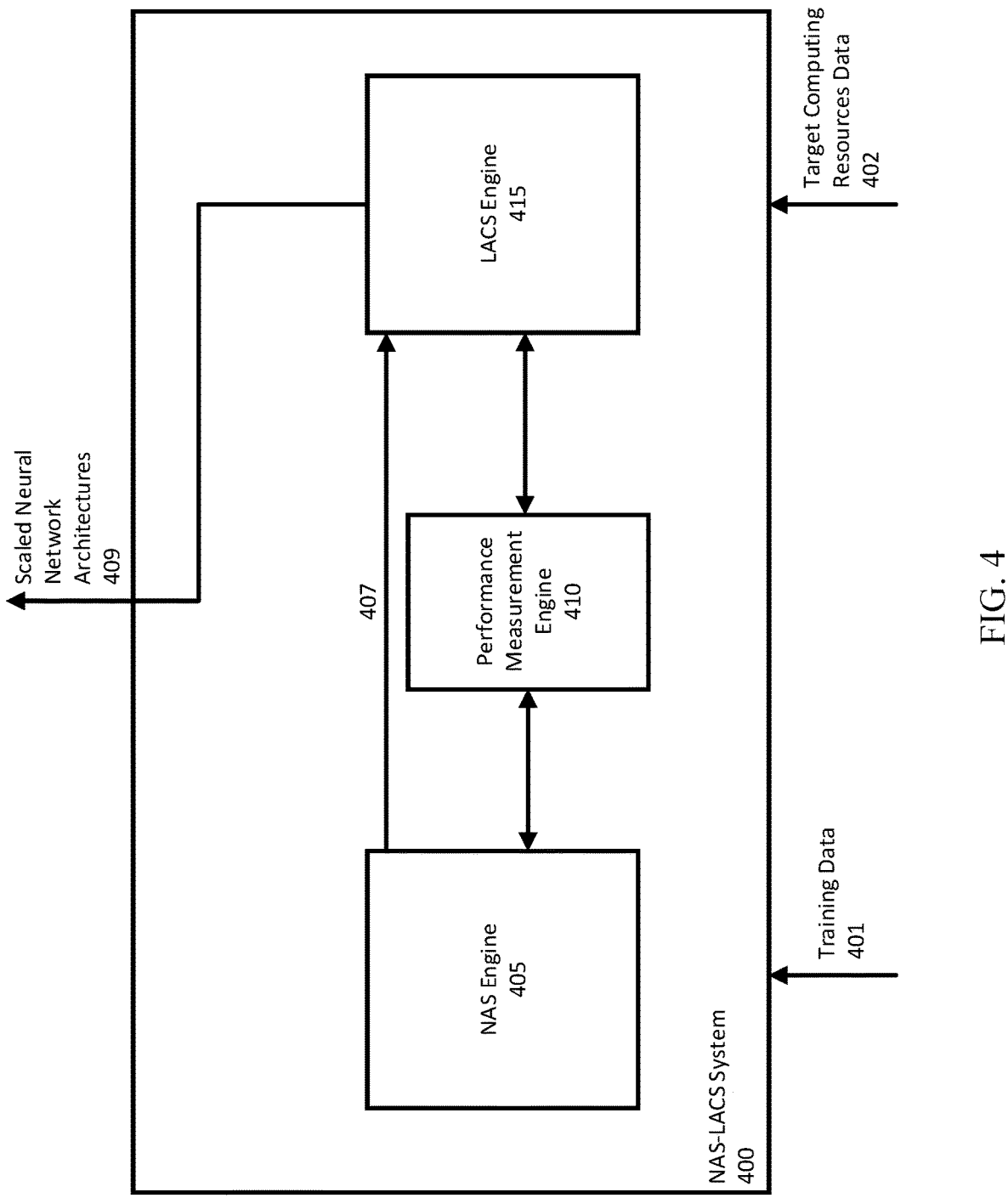
FIG. 4 is a block diagram of a neural architecture search latency-aware compound scaling (NAS-LACS) system, according to aspects of the disclosure.

FIG. 4 is a block diagram of a neural architecture search latency-aware compound scaling (NAS-LACS) system 400, according to aspects of the disclosure. The system 400 is configured to receive training data 401 for performing a neural network, and target computing resources data 402 specifying target computing resources. The system 400 can be configured to implement the techniques for generating a family of scaled neural network architectures, as described herein with reference to FIGS. 1-3.

The system 400 can be configured to receive the input data according to a user interface. For example, the system 400 can receive the data as part of a call to an Application Program Interface (API) exposing the system 400. The system 400 can be implemented on one or more computing devices, as described herein with reference to FIG. 5. Input to the system 400 can be provided, for example, through a storage medium, including remote storage connected to the one or more computing devices over a network, or as input through a user interface on a client computing device coupled to the system 400.

The system 400 can be configured to output scaled neural network architectures 409, such as a family of scaled neural network architectures. The scaled neural network architectures 409 can be sent as output, for example for display on a user display, and optionally visualized in accordance with the shape and sizes of each neural network layer as defined in the architecture. In some implementations, the system 400 can be configured to provide the scaled neural network architectures 409 as a set of computer-readable instructions, such as a one or more computer programs, which can be executed by the target computing resources to implement the scaled neural network architectures 409.

A computer program can be written in any type of programming language, and according to any programming paradigm, e.g., declarative, procedural, assembly, object-oriented, data-oriented, functional, or imperative. A computer program can be written to perform one or more different functions and to operate within a computing environment, e.g., on a physical device, virtual machine, or across multiple devices. A computer program can also implement functionality described in this specification, for example, as performed by a system, engine, module, or model.

In some implementations, the system 400 is configured to forward data for the scaled neural network architectures 409 to one or more other devices configured for translating the architecture into an executable program written in a computer programming language and optionally as part of a framework for generating machine learning models. The system 400 can also be configured to send data corresponding to the scaled neural network architectures 409 to a storage device for storage and later retrieval.

The system 400 can include a NAS engine 405. The NAS engine 405 and other components of the system 400 can be implemented as one or more computer programs, specially configured electronic circuitry, or any combination of the preceding. The NAS engine 405 can be configured to receive the training data 401 and the target computing resources data 402, and generate a base neural network architecture 407, which can be sent to a LACS engine 415. The NAS engine 405 can implement any of a variety of different techniques for neural architecture search described herein with reference to FIGS. 1-3. The system can be configured according to aspects of the disclosure to perform NAS using multiple objectives, including inference latency and accuracy of a candidate neural network when executed on the target computing resources. As part of determining performance metrics from which the NAS engine 405 can use to search for the base neural network architecture, the system 400 can include a performance measurement engine 410.

The performance measurement engine 410 can be configured for receiving an architecture for a candidate base neural network, and generating performance metrics according to the objectives used to perform NAS by the NAS engine 405. The performance metrics can provide an overall measure of performance of the candidate neural network according to the multiple objectives. To determine the accuracy of the candidate base neural network, the performance measurement engine 410 can execute the candidate base neural network over a validation set of training examples, for example obtaining the validation set by reserving some of the training data 401.

To measure latency, the performance measurement engine 410 can be in communication with computing resources corresponding to the target computing resources specified by the data 402. For example, if the target computing resources data 402 specifies a TPU as a target resource, the performance measurement engine 410 can send the candidate base neural network for execution on a corresponding TPU. The TPU may be housed in a datacenter in communication with one or more processors implementing the system 400, for example over a network as described in more detail with reference to FIG. 5.

The performance measurement engine 410 can receive latency information indicating the latency between the target computing resource receiving the input and generating the output. The latency information can be measured directly on-site to the target computing resource and sent to the performance measurement engine 410, or measured by the performance measurement engine 410 itself. If the performance measurement engine 410 measures the latency, the engine 410 can be configured to compensate for latency not attributed to processing the candidate base neural network, for example the network latency to communicate to and from the target computing resource. As another example, the performance measurement engine 410 can estimate the latency of processing input through the candidate base neural network, based on previous measurements for the target computing resource, and hardware characteristics for the target computing resource.

The performance measurement engine 410 can generate performance metrics for other characteristics of the candidate neural network architecture, such as its operational intensity and its execution efficiency. As described herein with reference to FIGS. 1-3, inference latency can be determined as a function of computation requirement (FLOPS), execution efficiency, and operational intensity together, and in some implementations the system 400 searches for and scales a neural network directly or indirectly based on these additional characteristics.

Once the performance metrics are generated, the performance measurement engine 410 can send the metrics to the NAS engine 405, which in turn can iterate a new search for a new candidate base neural network architecture, until reaching stopping criteria as described herein with reference with FIG. 2.

In some examples, the NAS engine 405 is tuned according to one or more controller parameters for adjusting how the NAS engine 405 selects a next candidate base neural network architecture. The controller parameters can be hand-tuned according to desired characteristics of a neural network for a particular neural network task. In some examples, the controller parameters can be learned through any of a variety of a machine learning technique, and the NAS engine 405 can implement one or more machine learning models trained for selecting a base neural network architecture according to multiple objectives, such as latency and accuracy. For example, the NAS engine 405 can implement a recurrent neural network trained to use features of a previous candidate base neural network and the multiple objectives, to predict a candidate base network more likely to satisfy the objectives. The neural network can be trained using the performance metrics and training data labeled to indicate final base neural architecture selected given a set of training data associated with a neural network task, and target computing resources data.

The LACS engine 415 can be configured to perform latency-aware compound scaling, described according to aspects of the disclosure. The LACS engine 415 is configured to receive data 407 specifying a base neural network architecture from the NAS engine 405. Similar to the NAS engine 405, the LACS engine 415 can communicate with the performance measurement engine 410 to obtain performance metrics for a candidate scaled neural network architecture. The LACS engine 415 can maintain a search space in memory of different tuples of scaling coefficients, and can also be configured for scaling a final scaled architecture to quickly obtain a family of scaled neural network architectures, as described herein with reference to FIGS. 1-3. In some implementations, the LACS engine 415 is configured to perform other forms of scaling, e.g., simple scaling, but using multiple objectives used by the NAS engine 405, including latency.

Figure 5:
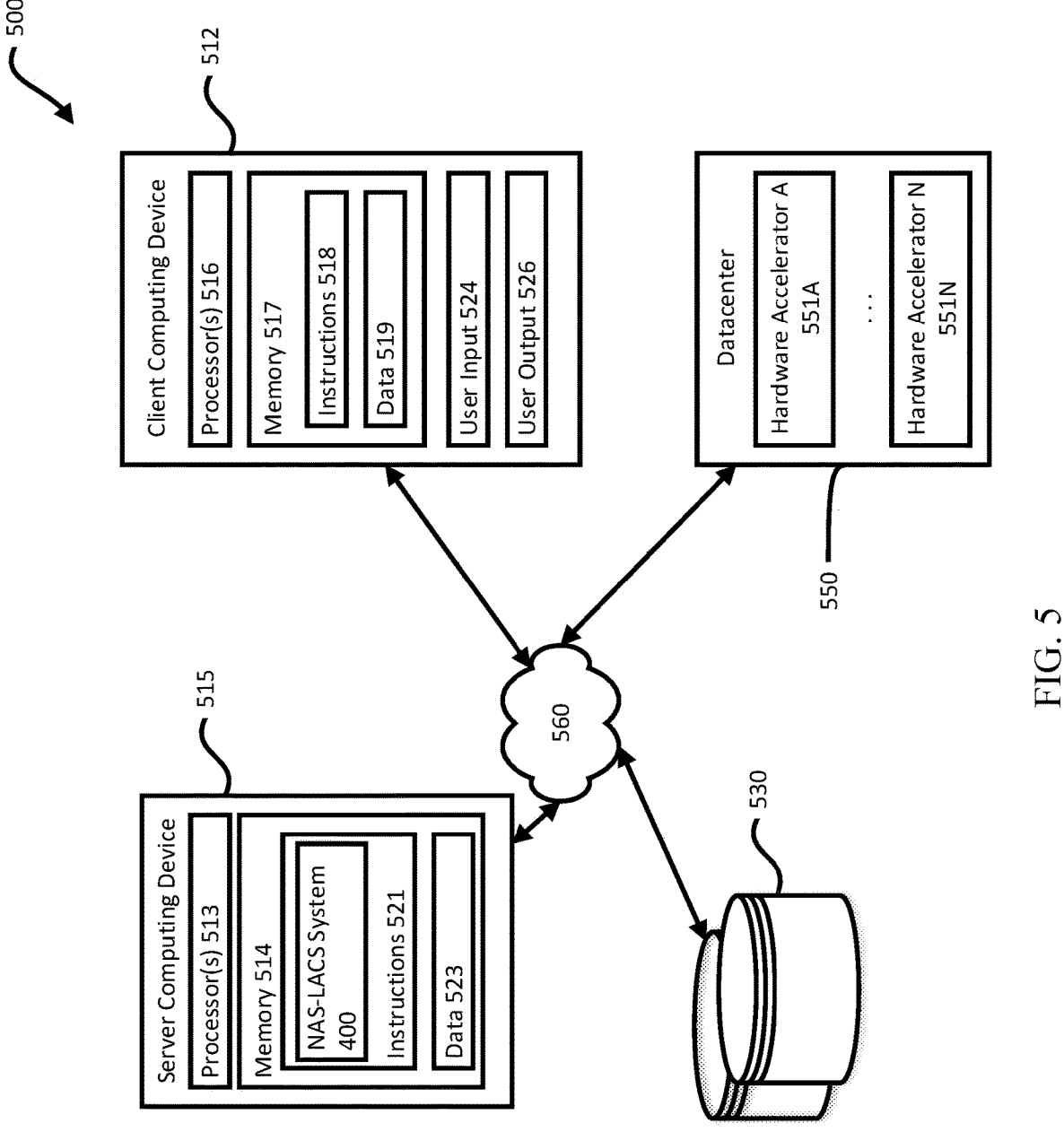
FIG. 5 is a block diagram of an example environment for implementing the NAS-LACS system.

FIG. 5 is a block diagram of an example environment 500 for implementing the NAS-LACS system 400. The system 400 can be implemented on one or more devices having one or more processors in one or more locations, such as in server computing device 515. Client computing device 512 and the server computing device 515 can be communicatively coupled to one or more storage devices 530 over a network 560. The storage device(s) 530 can be a combination of volatile and non-volatile memory, and can be at the same or different physical locations than the computing devices 512, 515. For example, the storage device(s) 530 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 515 can include one or more processors 513 and memory 514. The memory 514 can store information accessible by the processor(s) 513, including instructions 521 that can be executed by the processor(s) 513. The memory 514 can also include data 523 that can be retrieved, manipulated or stored by the processor(s) 513. The memory 514 can be a type of non-transitory computer readable medium capable of storing information accessible by the processor(s) 513, such as volatile and non-volatile memory. The processor(s) 513 can include one or more central processing units (CPUs), graphic processing units (GPUs), field-programmable gate arrays (FGPAs), and/or application-specific integrated circuits (ASICs), such as tensor processing units (TPUs).

The instructions 521 can include one or more instructions that when executed by the processor(s) 513, causes the one or more processors to perform actions defined by the instructions. The instructions 521 can be stored in object code format for direct processing by the processor(s) 513, or in other formats including interpretable scripts or collections of independent source code modules that are interpreted on demand or compiled in advance. The instructions 521 can include instructions for implementing the system 400 consistent with aspects of this disclosure. The system 400 can be executed using the processor(s) 513, and/or using other processors remotely located from the server computing device 515.

The data 523 can be retrieved, stored, or modified by the processor(s) 513 in accordance with the instructions 521. The data 523 can be stored in computer registers, in a relational or non-relational database as a table having a plurality of different fields and records, or as JSON, YAML, proto, or XML documents. The data 523 can also be formatted in a computer-readable format such as, but not limited to, binary values, ASCII or Unicode. Moreover, the data 523 can include information sufficient to identify relevant information, such as numbers, descriptive text, proprietary codes, pointers, references to data stored in other memories, including other network locations, or information that is used by a function to calculate relevant data.

The client computing device 512 can also be configured similar to the server computing device 515, with one or more processors 516, memory 517, instructions 518, and data 519. The client computing device 512 can also include a user output 526, and a user input 524. The user input 524 can include any appropriate mechanism or technique for receiving input from a user, such as keyboard, mouse, mechanical actuators, soft actuators, touchscreens, microphones, and sensors.

The server computing device 515 can be configured to transmit data to the client computing device 512, and the client computing device 512 can be configured to display at least a portion of the received data on a display implemented as part of the user output 526. The user output 526 can also be used for displaying an interface between the client computing device 512 and the server computing device 515. The user output 526 can alternatively or additionally include one or more speakers, transducers or other audio outputs, a haptic interface or other tactile feedback that provides non-visual and non-audible information to the platform user of the client computing device 512.

Although FIG. 5 illustrates the processors 513, 516 and the memories 514, 517 as being within the computing devices 515, 512, components described in this specification, including the processors 513, 516 and the memories 514, 517 can include multiple processors and memories that can operate in different physical locations and not within the same computing device. For example, some of the instructions 521, 518 and the data 523, 519 can be stored on a removable SD card and others within a read-only computer chip. Some or all of the instructions and data can be stored in a location physically remote from, yet still accessible by, the processors 513, 516. Similarly, the processors 513, 516 can include a collection of processors that can perform concurrent and/or sequential operation. The computing devices 515, 512 can each include one or more internal clocks providing timing information, which can be used for time measurement for operations and programs run by the computing devices 515, 512.

The server computing device 515 can be connected over the network 560 to a datacenter 550 housing hardware accelerators 551A-N. The datacenter 550 can be one of multiple datacenters or other facilities in which various types of computing devices, such as hardware accelerators, are located. The computing resources housed in the datacenter 550 can be specified as part of target computing resources for deploying scaled neural network architectures, as described herein.

The server computing device 515 can be configured to receive requests to process data from the client computing device 512 on computing resources in the datacenter 550. For example, the environment 500 can be part of a computing platform configured to provide a variety of services to users, through various user interfaces and/or APIs exposing the platform services. One or more services can be a machine learning framework or a set of tools for generating neural networks or other machine learning models according to a specified task and training data. The client computing device 512 may receive and transmit data specifying target computing resources to be allocated for executing a neural network trained to perform a particular neural network task. The NAS-LACS system 400 can receive the data specifying the target computing resources and the training data, and in response generate a family of scaled neural network architectures for deploying on the target computing resources, according to aspects of the disclosure described herein with reference to FIGS. 1-4.

As other examples of potential services provided by a platform implementing the environment 500, the server computing device 515 can maintain a variety of families of scaled neural networks architectures in accordance with different potential target computing resources available at the datacenter 550. For example, the server computing device 515 can maintain different families for deploying neural networks on the various types of TPUs and/or GPUs housed in the datacenter 550 or otherwise available for processing.

The devices 512, 515, and the datacenter 550 can be capable of direct and indirect communication over the network 560. For example, using a network socket, the client computing device 512 can connect to a service operating in the datacenter 550 through an Internet protocol. The devices 515, 512 can set up listening sockets that may accept an initiating connection for sending and receiving information. The network 560 itself can include various configurations and protocols including the Internet, World Wide Web, intranets, virtual private networks, wide area networks, local networks, and private networks using communication protocols proprietary to one or more companies. The network 560 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 560, in addition or alternatively, can also support wired connections between the devices 512, 515, and the datacenter 550, including over various types of Ethernet connection.

Although a single server computing device 515, client computing device 512, and datacenter 550 are shown in FIG. 5, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing neural networks, and any combination thereof.

Example Use Cases

As described herein, aspects of the disclosure provide for generating an architecture for a neural network scaled from a base neural network according to a multi-objective approach. Examples of neural network tasks follow.

As an example, the input to the neural network can be in the form of images, videos. A neural network can be configured to extract, identify, and generate features as part of processing a given input, for example as part of a computer vision task. A neural network trained to perform this type of neural network task can be trained to generate an output classification from a set of different potential classifications. In addition or alternatively, the neural network can be trained to output a score corresponding to an estimated probability that an identified subject in the image or video belongs to a certain class.

As another example, the input to the neural network can be data files corresponding to a particular format, e.g., HTML files, word processing documents, or formatted metadata obtained from other types of data, such as metadata for image files. A neural network task in this context can be to classify, score, or otherwise predict some characteristic about the received input. For example, a neural network can be trained to predict the probability received input includes text relating to a particular subject. Also as part of performing a particular task, the neural network can be trained to generate text predictions, for example as part of a tool for auto-completion of text in a document as the document is being composed. A neural network can also be trained for predicting a translation of text in an input document to a target language, for example as a message is being composed.

Other types of input documents can be data relating to characteristics of a network of interconnected devices. These input documents can include activity logs, as well as records concerning access privileges for different computing devices to access different sources of potentially sensitive data. A neural network can be trained for processing these and other types of documents for predicting on-going and future security breaches to the network. For example, the neural network can be trained to predict intrusion into the network by a malicious actor.

As another example, the input to a neural network can be audio input, including streamed audio, pre-recorded audio, and audio as part of a video or other source or media. A neural network task in the audio context can include speech recognition, including isolating speech from other identified sources of audio and/or enhancing characteristics of identified speech to be easier to hear. A neural network can be trained to predict an accurate translation of input speech to a target language, for example in real-time as part of a translation tool.

In addition to data input, including the various types of data described herein, a neural network can also be trained to process features corresponding to given input. Features are values, e.g., numerical or categorical, which relate to some characteristic of the input. For example, in the context of an image, a feature of the image can relate to the RGB value for each pixel in the image. A neural network task in the image/video context can be to classify contents of an image or video, for example for the presence of different people, places, or things. Neural networks can be trained to extract and select relevant features for processing to generate an output for a given input, and can also be trained to generate new features based on learned relationships between various characteristics of input data.

Aspects of this disclosure can be implemented in digital circuits, computer-readable storage media, as one or more computer programs, or a combination of one or more of the foregoing. The computer-readable storage media can be non-transitory, e.g., as one or more instructions executable by processor(s) and stored on a tangible storage device.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method for determining an architecture for a neural network, comprising:

receiving, by one or more processors, information specifying target computing resources for deploying the neural network to perform a neural network task, wherein the information specifying the target computing resources specifies different types of available hardware accelerators;

receiving, by the one or more processors, data specifying an architecture for a base neural network based on a neural architecture search involving a search space augmented to account for parallelism of the different types of available hardware accelerators;

identifying, by the one or more processors, a plurality of scaling parameter values for scaling the base neural network according to the information specifying the target computing resources and a plurality of scaling parameters for the base neural network, scaling the base neural network comprising at least one of adjusting a number of neural network layers or a size of one or more neural network layers of the base neural network, wherein the identifying comprises repeatedly performing the following:

selecting a plurality of candidate scaling parameter values, determining a measure of performance for the base neural network scaled according to the plurality of candidate scaling parameter values, wherein the measure of performance is determined in accordance with an accuracy objective and a latency objective when operating the neural network using the parallelism of the different types of available hardware accelerators, and comparing the measure of performance to a performance threshold to determine whether the measure of performance meets the performance threshold, wherein the performance threshold comprises an accuracy threshold and a latency threshold that are particular to the neural network task;

generating, by the one or more processors, an architecture for a scaled neural network using the architecture of the base neural network scaled according to the plurality of scaling parameter values in response to the measure of performance meeting the performance threshold; and deploying, by the one or more processors, the scaled neural network on the different types of available hardware accelerators to perform the neural network task.

2. The method of claim 1, wherein receiving the data specifying the architecture for the base neural network comprises:

receiving, by the one or more processors, training data corresponding to the neural network task, and performing, by the one or more processors, using the training data and in accordance with a plurality of objectives, the neural architecture search to identify the architecture for the base neural network.

3. The method of claim 2, wherein the search space comprises candidate neural network layers, each candidate neural network layer comprising different respective activation functions and configured to perform one or more respective operations.

4. The method of claim 3, wherein the architecture of the base neural network comprises a plurality of components, each component having a respective plurality of neural network layers.

5. The method of claim 2, wherein the plurality of objectives for performing the neural architecture search comprises the accuracy objective and the latency objective.

6. The method of claim 1, wherein the accuracy objective corresponds to a minimum accuracy of output of the base neural network when deployed on the target computing resources.

7. The method of claim 1, wherein the measure of performance corresponds at least in part with a measure of latency between the base neural network receiving an input and generating an output when the base neural network is scaled according to the plurality of candidate scaling parameter values and deployed on the target computing resources.

8. The method of claim 1, wherein the latency objective corresponds to a minimal latency between the base neural network receiving an input and generating an output when the base neural network is deployed on the target computing resources.

9. The method of claim 1, wherein deploying the scaled neural network on the different types of available hardware accelerators further comprises executing the scaled neural network on the different types of available hardware accelerators to perform the neural network task.

10. The method of claim 1, wherein the performance threshold is a composite of the accuracy threshold and the latency threshold.

11. The method of claim 1, wherein generating the scaled neural network architecture further comprises generating the scaled neural network architecture using a plurality of second scaling parameter values, the second scaling parameter values being generated based on the plurality of scaling parameters values modified by one or more compound coefficients.

12. The method of claim 1, wherein the base neural network is a convolutional neural network and the plurality of scaling parameters comprise one or more of a depth of the base neural network, a width of the base neural network, or a resolution of input for the base neural network.

13. A system comprising:

one or more processors, and one or more storage devices coupled to the one or more processors and storing instructions that, when performed by the one or more processors, cause the one or more processors to perform operations for determining an architecture for a neural network, the operations comprising:

receiving information specifying target computing resources for deploying the neural network to perform a neural network task, wherein the information specifying the target computing resources specifies different types of available hardware accelerators;

receiving data specifying an architecture for a base neural network based on a neural architecture search involving a search space augmented to account for parallelism of the different types of available hardware accelerators;

identifying a plurality of scaling parameter values for scaling the base neural network according to the information specifying the target computing resources and a plurality of scaling parameters for the base neural network, scaling the base neural network comprising at least one of adjusting a number of neural network layers or a size of one or more neural network layers of the base neural network, wherein the identifying comprises repeatedly performing the following:

selecting a plurality of candidate scaling parameter values, determining a measure of performance for the base neural network scaled according to the plurality of candidate scaling parameter values, wherein the measure of performance is determined by an accuracy objective and a latency objective when operating the neural network using the parallelism of the different types of available hardware accelerators, and comparing the measure of performance to a performance threshold to determine whether the measure of performance meets the performance threshold, wherein the performance threshold comprises an accuracy threshold and a latency threshold that are particular to the neural network task;

generating an architecture for a scaled neural network using the architecture of the base neural network scaled according to the plurality of scaling parameter values in response to the measure of performance meeting the performance threshold; and deploying the scaled neural network on the different types of available hardware accelerators to perform the neural network task.

14. The system of claim 13, wherein receiving the data specifying the architecture for the base neural network comprises:

receiving training data corresponding to the neural network task, and performing, using the training data and in accordance with a plurality of objectives, the neural architecture search to identify the architecture for the base neural network.

15. The system of claim 14, wherein the search space comprises candidate neural network layers, each candidate neural network layer comprising different respective activation functions and configured to perform one or more respective operations.

16. The system of claim 14, wherein the plurality of objectives for performing the neural architecture search comprises the accuracy objective and the latency objective.

17. The system of claim 13, wherein the accuracy objective corresponds to a minimum accuracy of output of the base neural network when deployed on the target computing resources.

18. The system of claim 13, wherein the measure of performance corresponds at least in part with a measure of latency between the base neural network receiving an input and generating an output when the base neural network is scaled according to the plurality of candidate scaling parameter values and deployed on the target computing resources.

19. The system of claim 13, wherein the latency objective corresponds to a minimal latency between the base neural network receiving an input and generating an output when the base neural network is deployed on the target computing resources.

20. One or more non-transitory computer readable storage media storing instructions that when executed by one or more processors, causes the one or more processors to perform operations for determining an architecture for a neural network, comprising:

receiving information specifying target computing resources for deploying the neural network to perform a neural network task, wherein the information specifying the target computing resources specifies different types of available hardware accelerators;

receiving, by the one or more processors, data specifying an architecture for a base neural network based on a neural architecture search involving a search space augmented to account for parallelism of the different types of available hardware accelerators;

identifying a plurality of scaling parameter values for scaling the base neural network according to the information specifying the target computing resources and a plurality of scaling parameters for the base neural network, scaling the base neural network comprising at least one of adjusting a number of neural network layers or a size of one or more neural network layers of the base neural network, wherein the identifying comprises repeatedly performing the following:

selecting a plurality of candidate scaling parameter values, determining a measure of performance for the base neural network scaled according to the plurality of candidate scaling parameter values, wherein the measure of performance is determined in accordance with an accuracy objective and a latency objective when operating the neural network using the parallelism of the different types of available hardware accelerators, and comparing the measure of performance to a performance threshold to determine whether the measure of performance meets the performance threshold, wherein the performance threshold comprises an accuracy threshold and a latency threshold that are particular to the neural network task;

generating an architecture for a scaled neural network using the architecture of the base neural network scaled according to the plurality of scaling parameter values in response to the measure of performance meeting the performance threshold; and deploying the scaled neural network on the different types of available hardware accelerators to perform the neural network task.

* * * * *